(12) United States Patent
Sievers (10) Patent No.: US 11,833,739 B2
(45) Date of Patent: Dec. 5, 2023

(54) ADDITIVE PLATE MAKING SYSTEM AND METHOD

(71) Applicant: Esko-Graphics Imaging GmbH, Itzehoe (DE)

(72) Inventor: Wolfgang Sievers, Kremperheide (DE)

(73) Assignee: Esko-Graphics Imaging GmbH, Itzehoe (DE)

( * ) Notice: Subject to any disclaimer, the term of this patent is extended or adjusted under 35 U.S.C. 154(b) by 105 days.

(21) Appl. No.: 17/057,761

(22) PCT Filed: Aug. 20, 2019

(86) PCT No.: PCT/EP2019/072282
§ 371 (c)(1),
(2) Date: Nov. 23, 2020

(87) PCT Pub. No.: WO2020/038951
PCT Pub. Date: Feb. 27, 2020

(65) Prior Publication Data
US 2021/0299942 A1    Sep. 30, 2021

Related U.S. Application Data

(60) Provisional application No. 62/719,959, filed on Aug. 20, 2018.

(51) Int. Cl.
*B29C 64/112*    (2017.01)
*B29C 64/209*    (2017.01)
(Continued)

(52) U.S. Cl.
CPC .......... *B29C 64/112* (2017.08); *B29C 64/209* (2017.08); *B29C 64/236* (2017.08);
(Continued)

(58) Field of Classification Search
CPC ... B29C 64/112; B29C 64/209; B29C 64/277; B29C 64/282; B29C 64/264;
(Continued)

(56) References Cited

U.S. PATENT DOCUMENTS

| 4,780,730 A | 10/1988 | Dodge et al. |
| 6,259,962 B1 | 7/2001 | Gothait |

(Continued)

FOREIGN PATENT DOCUMENTS

| EP | 1437882 A1 | 7/2004 |
| EP | 2199065 A1 | 6/2010 |

(Continued)

OTHER PUBLICATIONS

International Search Report and Written Opinion for International Application No. PCT/EP2019/072282, dated Nov. 20, 2019, 12 pages.

(Continued)

*Primary Examiner* — Yunju Kim
(74) *Attorney, Agent, or Firm* — RatnerPrestia (57) ABSTRACT

A process for constructing a printing plate by successively depositing a plurality of n layers of photopolymer on a substrate, curing each layer 1 through (n-m) using a wide area radiation source, and selectively curing layers (n-m+1) to layer n using a small area radiation source modulated in accordance with a desired image to be printed by the printing plate. Non-cured polymer is removed from layers (n-m+1) to n, and all of the layers are further cured with a detacking area radiation source. Also disclosed is a system for constructing a printing plate by additive manufacturing, including a printing assembly and means for providing relative motion between the substrate and the printing assembly. The assem-

(Continued)

Step A n

Print last polymer layers on substrate

Step C cure last polymer layer selectively with UV Laser bly comprises one or more ink jet print heads, at least one wide area radiation source, and the small area radiation source.

22 Claims, 10 Drawing Sheets

(51) Int. Cl.
| | |
|---|---|
| *B29C 64/236* | (2017.01) |
| *B29C 64/241* | (2017.01) |
| *B29C 64/277* | (2017.01) |
| *B33Y 10/00* | (2015.01) |
| *B33Y 30/00* | (2015.01) |
| *B41C 1/00* | (2006.01) |
| *B29L 31/00* | (2006.01) |

(52) U.S. Cl.
CPC .......... *B29C 64/241* (2017.08); *B29C 64/277* (2017.08); *B33Y 10/00* (2014.12); *B33Y 30/00* (2014.12); *B41C 1/003* (2013.01); *B29L 2031/767* (2013.01)

(58) Field of Classification Search
CPC ..... B29C 64/236; B29C 64/241; B29C 64/35; B29C 64/268; B29C 64/273; B29C 64/124; B29C 64/129; B29C 64/135
See application file for complete search history.

(56) References Cited

U.S. PATENT DOCUMENTS

| | | | |
|---|---|---|---|
| 6,567,205 B1 | 5/2003 | Eggers et al. | |
| 8,848,233 B2 * | 9/2014 | Gullentops | G06K 15/00 358/3.32 |
| 2002/0171177 A1 | 11/2002 | Kritchman et al. | |
| 2005/0211120 A1 | 9/2005 | Markhart | |
| 2007/0084368 A1 | 4/2007 | Vest et al. | |
| 2011/0249048 A1 | 10/2011 | Gullentops et al. | |
| 2016/0311163 A1 * | 10/2016 | Yasukochi | B33Y 10/00 |
| 2016/0325499 A1 * | 11/2016 | Muller | A61L 27/3804 |
| 2018/0031973 A1 | 2/2018 | Vest et al. | |
| 2018/0210345 A1 * | 7/2018 | Wolterink | G03F 7/2004 |

FOREIGN PATENT DOCUMENTS

| | | |
|---|---|---|
| EP | 2199066 A1 | 6/2010 |
| EP | 3000602 A1 | 3/2016 |
| EP | 3181357 A1 | 6/2017 |
| JP | 2004188983 A | 7/2004 |
| WO | 2018114655 A1 | 6/2018 |

OTHER PUBLICATIONS

Xaar 1003 AMp brochure, dated Jan. 5, 2016, 2 pages.
Chinese Office Action with Search Report for Chinese Application No. 201980043266.5, dated Jan. 13, 2022, with translation, 13 pages.
International Preliminary Report on Patentability and Written Opinion for International Application No. PCT/ EP2019/072282, dated Feb. 23, 2021, 10 pages.
Japanese Notice of Reasons for Refusal for Japanese Application No. 2020-571646, dated Jun. 1, 2023 with translation, 8 pages.

* cited by examiner

ADDITIVE PLATE MAKING SYSTEM AND METHOD

CROSS REFERENCE TO RELATED APPLICATIONS

This application is a U.S. National Phase of PCT Application No. PCT/EP2019/072282, filed Aug. 20, 2019, and claims the benefit of priority of U.S. Provisional Application No. 62/719,959, entitled ADDITIVE PLATE MAKING SYSTEM AND METHOD, filed on Aug. 20, 2018, the contents of which are incorporated herein by reference in their entirety for all purposes.

BACKGROUND OF THE INVENTION

The use of additive manufacturing techniques to make printing plates has been described in numerous references, including but not limited to EP1437882B1, EP2199066B1, EP2199065B1, EP3000602A1, and EP3181357A1, all of which are incorporated herein by reference.

In general, some prior art methods are suitable for only providing structures with a relatively coarse resolution (e.g. between 10 and 600 DPI), which limits usefulness of the process to applications requiring only coarse image resolutions in that range. Relatively low viscosity polymers suitable for jetting through high resolution ink jet print heads are relatively brittle and provide limited flexibility after curing, whereas polymers that are relatively more flexible after curing typically have a relatively higher viscosity and therefore only work with coarse resolution ink jet print heads.

In general, additive manufacturing techniques are more environmentally friendly than traditional methods that result in the generation of a relatively high volume of chemical and photopolymer waste. Thus, there is a need in the art for improved processes for using additive manufacturing to create printing plates with higher resolution.

SUMMARY OF THE INVENTION

One aspect of the invention comprises a process for constructing a printing plate. The process comprising the steps of successively depositing a plurality of n layers of photopolymer on a substrate, curing each layer 1 through (n-m) after deposition of each layer using a wide area radiation source configured to emit radiation in the predetermined wavelength range (such as but not limited to UV), and selectively curing layers (n-m+1) to layer n using a small area radiation source modulated in accordance with a desired image to be printed by the printing plate. The wide area radiation source has a first addressable area of coverage and the small area radiation source comprises one or more second discrete addressable areas of coverage, each second discrete addressable area smaller than the first addressable area. Then non-cured polymer is removed from layers (n-m+1) to n, and layers (n-m+1) to n are cured with a detacking wide area radiation source. The wide area radiation source may comprise an LED UV wide area source, and the small area radiation source may comprise a UV laser, a UV light source and a Digital Mirror Device for modulation of the light from the light source, or an array or a matrix of individually addressable LEDs.

The step of successively depositing the plurality of layers may generally comprise disposing a printing assembly comprising at least one ink jet print head, the wide area radiation source, and the small area radiation source in a spaced relationship relative to the substrate, and causing relative motion between the substrate and the printing assembly. In one embodiment, the substrate is disposed on a drum rotatable on an axis and the printing assembly is moved parallel to the drum while the drum rotates. In another embodiment, the substrate may be fixed on a flat bed and the printing assembly may be disposed on a carriage of a gantry, and the carriage may be moved along the gantry relative to the substrate in a first direction and the gantry may be moved relative to the substrate in a second direction perpendicular to the first direction. In still another embodiment, the substrate may be disposed on a moveable stage and the printing assembly disposed on a carriage, and the substrate may be moved in a first direction and the carriage moved in a second direction perpendicular to the first direction. The printing assembly may comprise a plurality of ink jet print heads, each print head comprising a plurality of nozzles and one or more wide area radiation sources configured to cure each layer before deposition of a subsequent layer.

Another aspect of the invention comprises a system for constructing a printing plate by additive manufacturing. The system comprises a printing assembly and means for providing relative motion between the substrate and the printing assembly. The printing assembly comprises one or more ink jet print heads, each comprising a plurality of nozzles configured to deposit a layer of photopolymer on a substrate, at least one wide area radiation source configured to emit radiation in the predetermined wavelength range for curing the photopolymer, and a small area radiation source configured to emit radiation in the predetermined wavelength range at a resolution and with a modulation in accordance with a desired image to be printed by the printing plate.

In one embodiment, the means for providing relative motion between the substrate and the printing assembly may comprise a drum configured to rotate on an axis to provide relative motion in a first direction and configured to receive the substrate, and a carriage configured to move relative to the drum in a second direction. In another embodiment, the system may have a flatbed configuration, wherein the means for providing relative motion between the substrate and the printing assembly comprises a stage configured to receive the substrate and a carriage mounted on a gantry. The gantry may be configured to move relative to the stage in a first direction with the carriage configured to move relative to the gantry in a second direction orthogonal to the first direction, or the stage may be configured to move relative to the gantry in a first direction and the carriage configured to move relative to the gantry in a second direction orthogonal to the first direction.

The printing assembly may comprise a plurality of n ink jet print heads, and a single wide area radiation source configured to cure each layer deposited by a first through (n-m)th inkjet layers before deposition of subsequent layers (n-m+1) to n, and the small area radiation source may be positioned to cure the (n-m+1) layers after deposition of the (n-m+1) layers. The system may be configured to provide movement of the substrate relative to the printing assembly along X and Y axes, wherein the printing assembly is configured to print and cure during relative movement in an X and -X direction, in a Y and -Y direction, or a combination thereof. The distance between the ink jet print heads and the substrate may be adjustable, including adjustable based upon a thickness of the photopolymer layer. The system may further include an assembly for removing uncured polymer from the printing surface of the printing plate and a wide area radiation source for detacking the printing surface of the printing plate, such as a UV-C source. The assembly for removing the uncured polymer comprises a pair of rollers for receiving the plate and a web positioned between one of the rollers and the printing surface of printing plate.

DETAILED DESCRIPTION OF THE INVENTION

Figure 1:
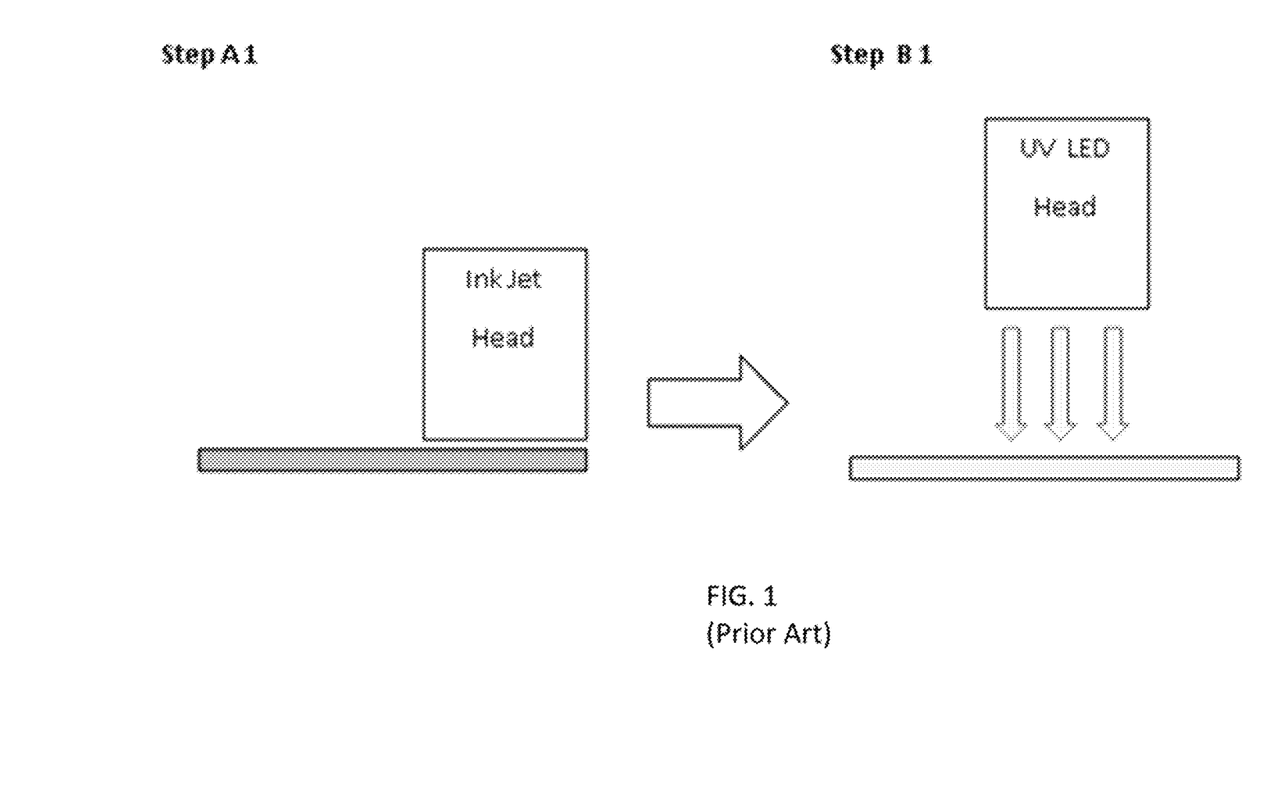
FIG. 1 schematically depicts steps of an exemplary prior art additive manufacturing process for making a printing plate.
Figure 2:
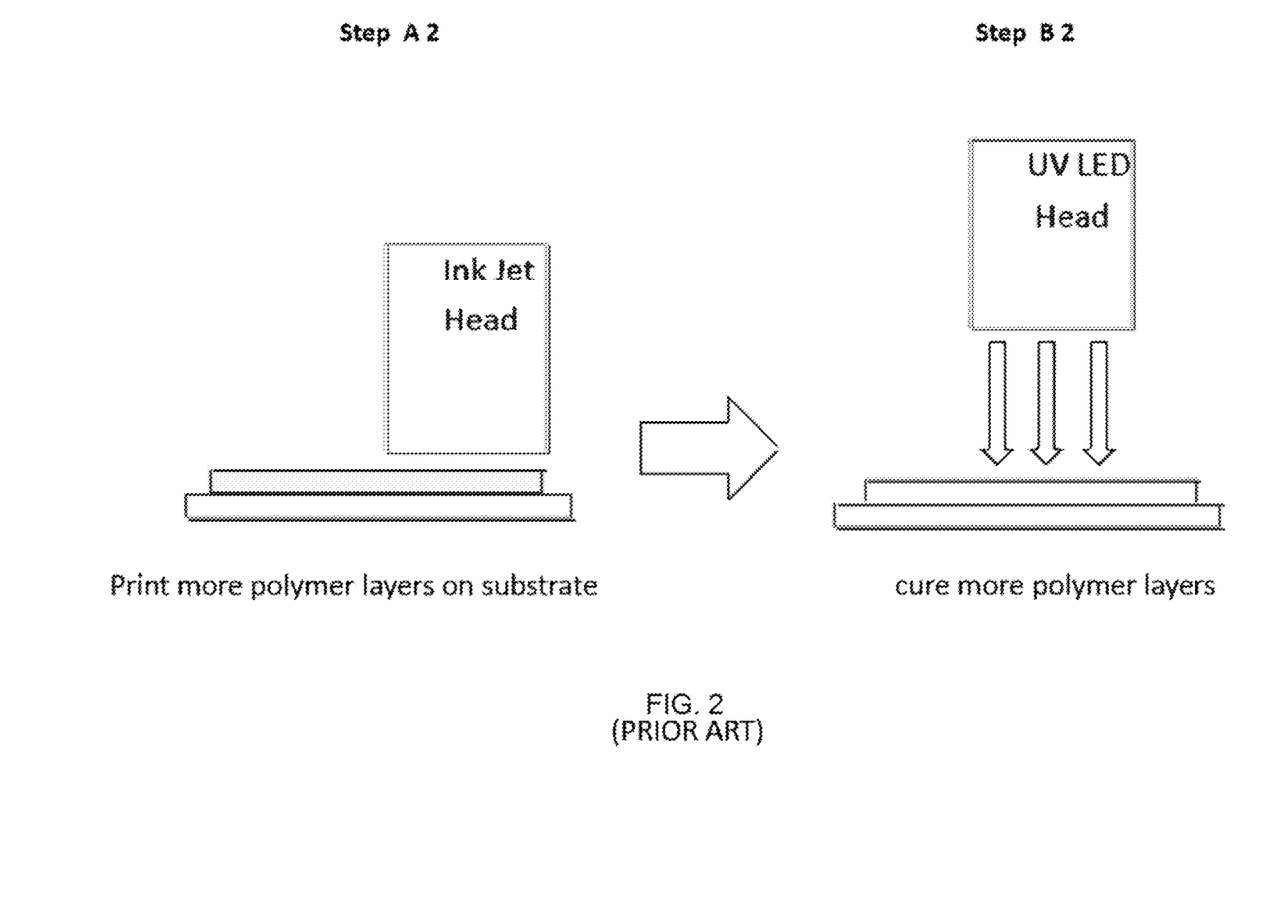
FIG. 2 schematically depicts additional steps of the exemplary prior art process for of FIG. 1.

As shown in FIG. 1, the general process for using additive manufacturing techniques to create printing plates involves printing a first layer of photopolymer 10 on a base sheet 12, such as polyester, in a desired pattern in step AI using an ink jet print head 14 and then curing each layer of photopolymer after printing using radiation at a suitable wavelength for curing the photopolymer, such as from a wide area source of ultraviolet radiation (UV) 16, such as from a wide area UV LED head, in step B1. As shown in FIG. 2, the process is repeated, with a second layer created in step A2 and B2. Steps A and B are performed a total of n times until the total thickness of all printed layers has the desired thickness. In order to form shoulders each subsequent layers cover smaller areas than the previous layer. The prior art process concludes once the final layer is deposited and cured.

Figure 3:
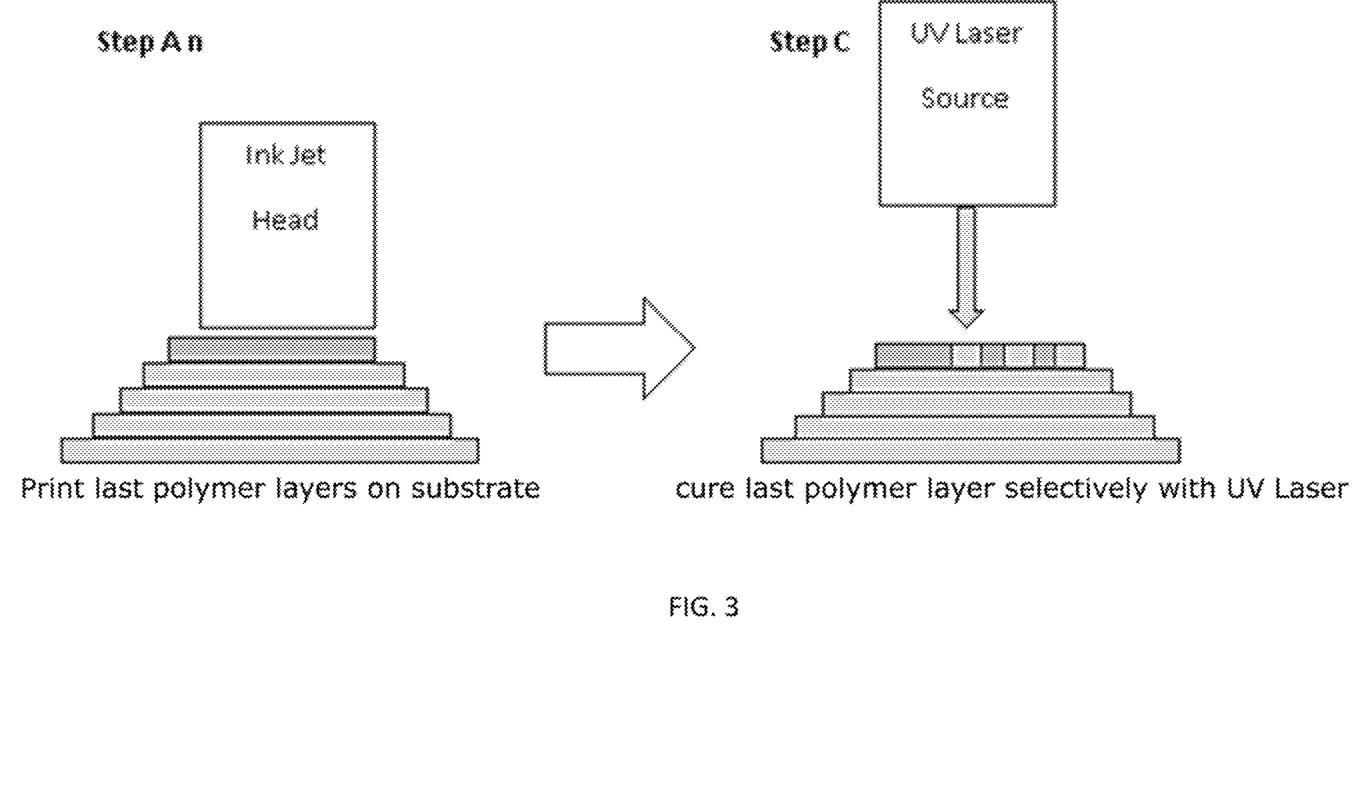
FIG. 3 schematically depicts steps of an exemplary embodiment of the invention.
Figure 4:
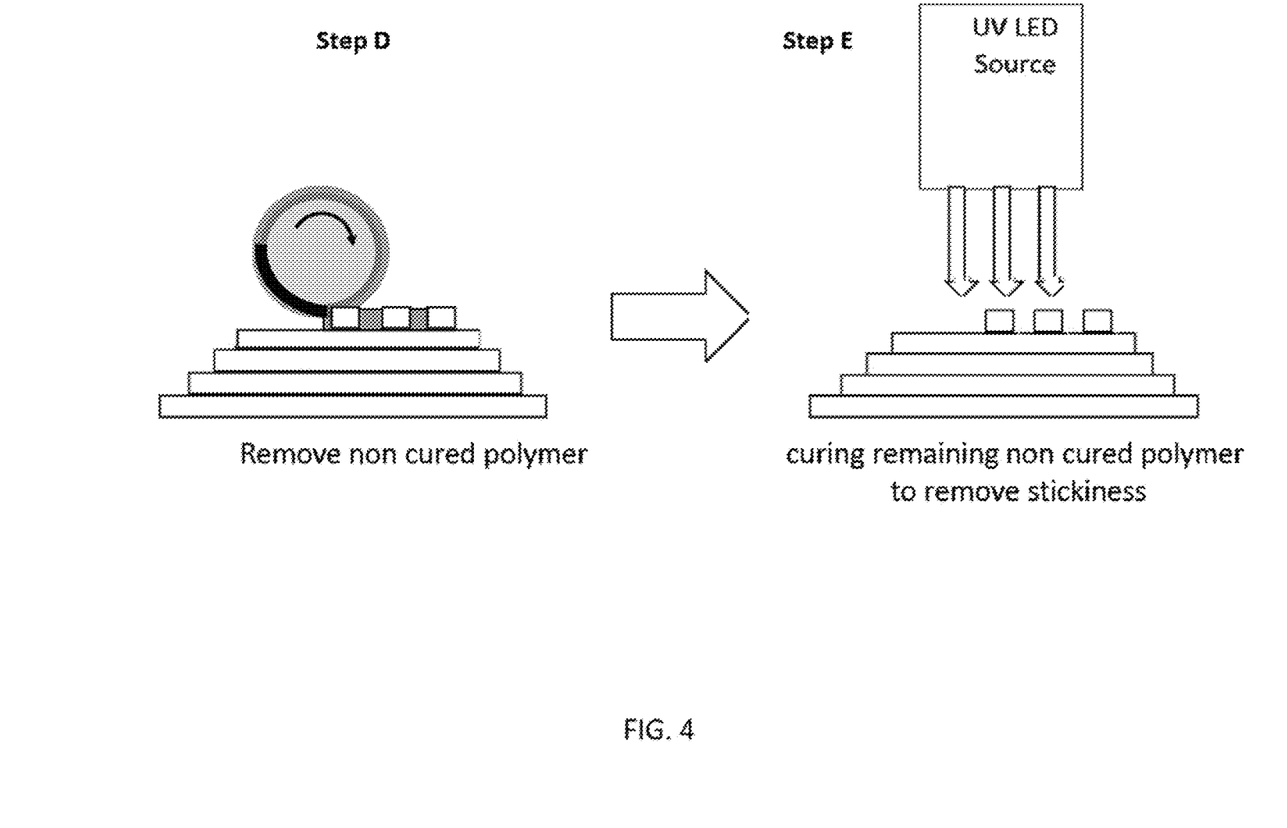
FIG. 4 schematically depicts additional steps of the exemplary embodiment of FIG. 3.

In the novel process described herein, as illustrated in FIG. 3, out of the total of n printed layers, layers 1 to n-m build support shoulders of the individual printing dots, whereas the top m layer or layers (m may equal 1 or more than 1) build printing details on top of the support shoulders. After each of the top m layer or layers is deposited in step A(n-m+1) through A(n), the layer is selectively cured with small radiation spots before printing the next layer, such as with a UV laser, which radiation is modulated in accordance with the desired image on the printing plate. Then, as illustrated in FIG. 4, after the selective curing step, non-cured polymer is removed, such as with an absorptive web, in Step D. Finally, in Step E, the plate is cured with a wide area LED UV radiation, such as emitting UV-C radiation, to "detack" the plate (to remove any stickiness or tackiness at the interfaces where the now-removed uncured polymer was in contact with cured polymer). The detacking wide area source may be a different source or the same sources than the wide area sources used for curing layers 1 to (n-m).

Figure 9:
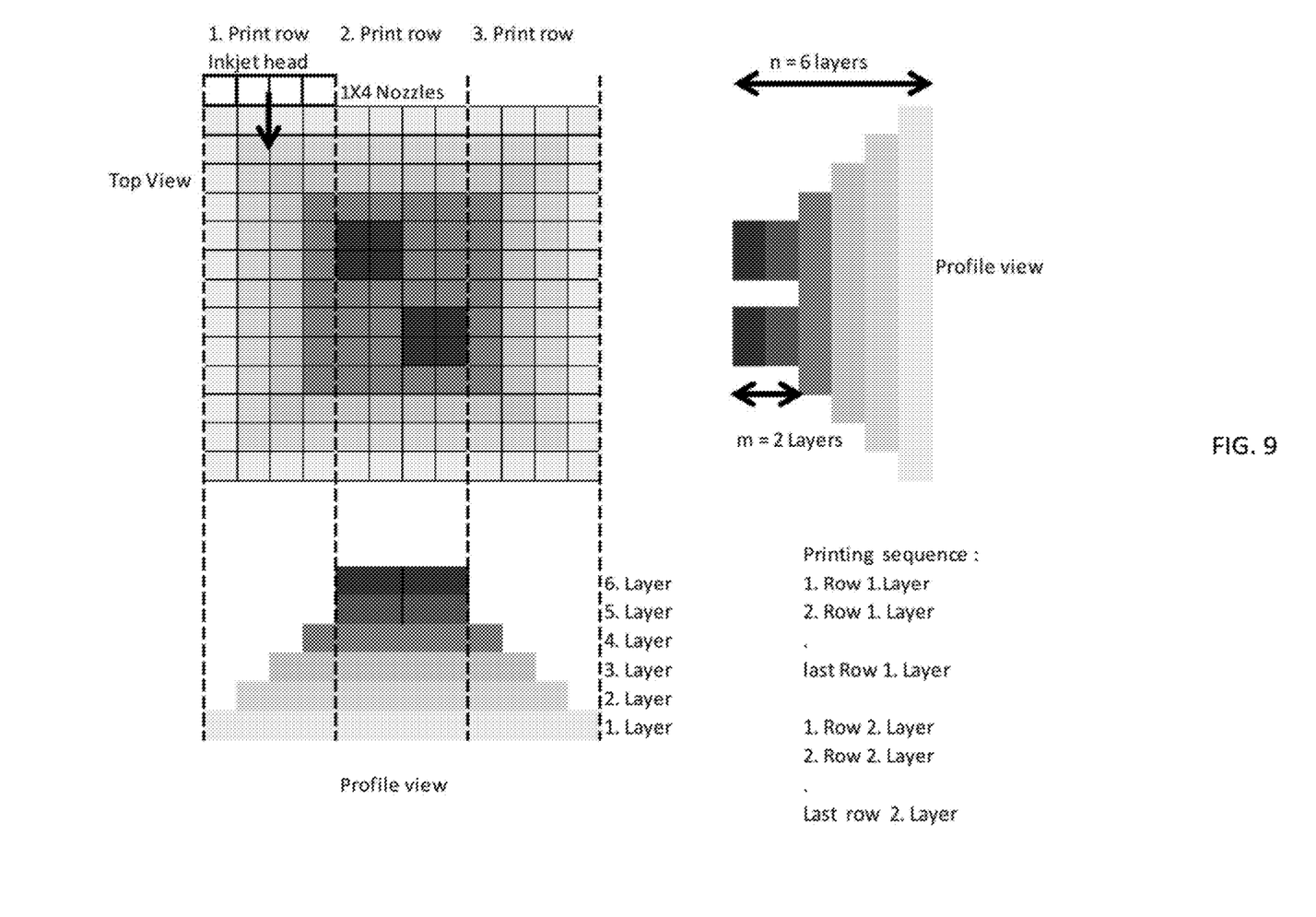
FIG. 9 depicts an exemplary n-layer structure as created by a process in accordance with one embodiment of the invention.

As schematically depicted in FIG. 9, using a single ink jet print head with 4 nozzles, printing encompasses printing each of print rows 1, 2 and 3 for Layer 1, then for Layers 2, 3, 4, 5, 6 in sequence (with curing after each row is deposited), resulting in the pyramidal structure depicted in the figure. With n=6, and m=2, Layers 1-4 are cured using a wide area source, and Layers 5 and 6 are cured using a small area source. The total number of layers n and the number of detail layers m are not limited to any particular numbers. As described further herein, assemblies having multiple print heads may permit a different sequence of layer deposition that increases the speed of the process.

Figure 5A:
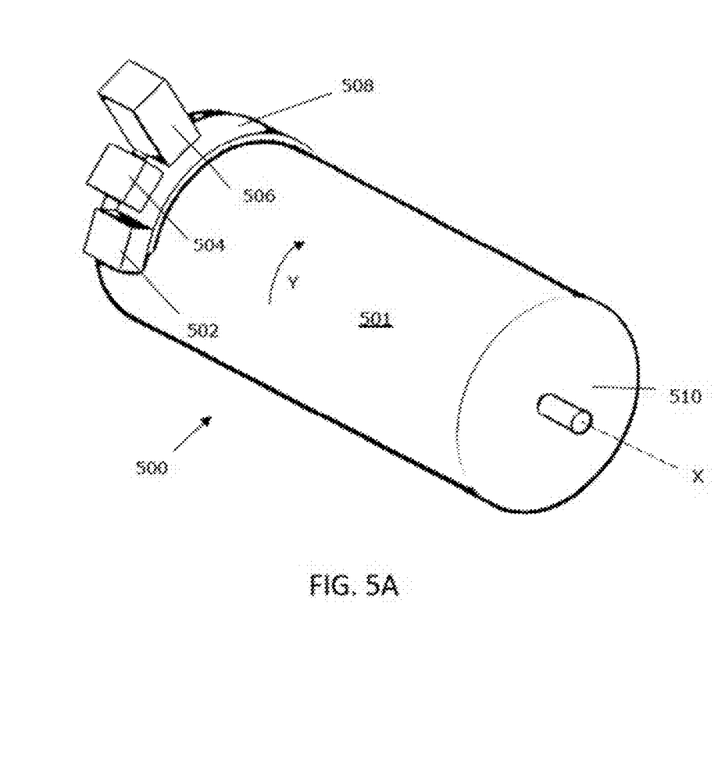
FIG. 5A depicts an exemplary system for creating a printing plate by additive manufacturing in accordance with a drum embodiment of the invention.

This process may be implemented by an apparatus 500 such as is illustrated in FIG. 5A. The apparatus comprises a mechanism 510, such as the drum depicted in FIG. 5A, for creating relative motion between the substrate 501 and an ink jet print head 502, a wide area radiation source 504, and a small area radiation source 506, so that layers of polymer 508 can be successively deposited and cured. As shown in FIG. 5A, the mechanism comprises a drum 510 on which the substrate is mounted and which revolves on axis X to create relative motion in the Y direction while the printing assembly 503 comprising ink jet print head 502, wide area radiation source 504, and laser radiation source 506 moves parallel to the X axis, such as on a carriage, while remaining in a fixed relationship relative to the drum in the Z direction.

Small area radiation source 506 may comprise a laser source or may comprise other UV sources known in the art. For example, an imaging engine comprising a Digital Mirror Device (DMD) for modulation of the radiation from the source and an UV lamp, such as is described in U.S. Pat. No. 6,567,205, incorporated herein by reference. This approach may be particularly well suited for flatbed embodiments. In another embodiment, the small area light source may comprise an array or a matrix of individually addressable UV LEDs, such as is described in U.S. Pat. No. 4,780,730, incorporated herein by reference. LEDs in a matrix or array may be modulated on and off according to the image data and the relative movement between polymer plate and LED array or matrix, similar to the modulation effected by the DMD as described in U.S. Pat. No. 6,567,205.

Figure 5B:
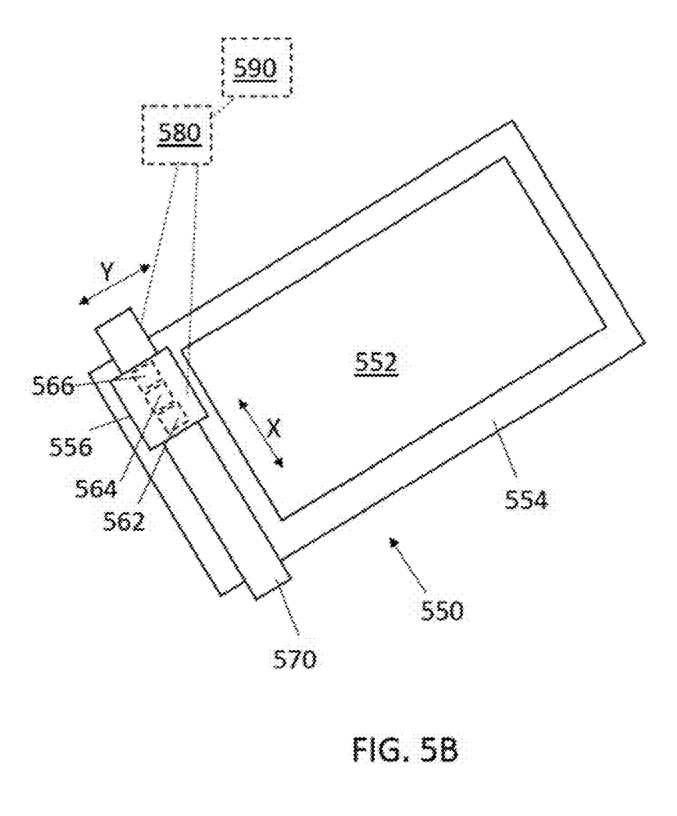
FIG. 5B depicts an exemplary system for creating a printing plate by additive manufacturing in accordance with a flatbed embodiment of the invention.

As shown in FIG. 5B, in other embodiments, such as the flatbed embodiment 550, the substrate 552 may be disposed as a flat sheet on a table 554, while the printing assembly 556 (in an arrangement similar to that depicted in FIG. 5A comprising an ink jet print head 562, a wide area radiation source 564, and a laser radiation source 566) may be movable in the X direction on a gantry 570 configured to traverse the sheet in the Y direction. It should be understood that the carriage may be relatively movable in the Y direction and the gantry relatively movable in the X direction in other embodiments. In still another flatbed relationship, table 554 may comprise a moveable stage configured to translate in a first direction (e.g. along the Y axis) and the printing assembly 556 movable in a second direction (e.g. along the X axis) perpendicular to the first direction. In still other embodiments, the printing assembly 556 may be completely stationary, and the movable stage configured to translate in both the X and Y directions to provide the relative motion.

Figure 5C:
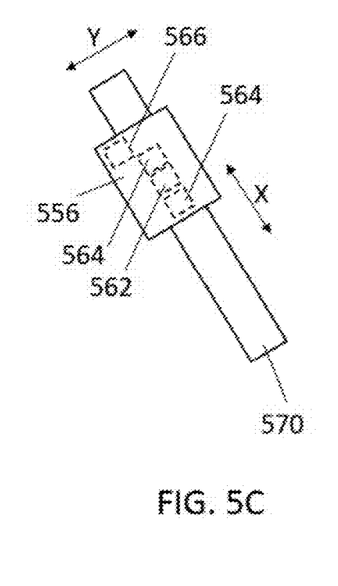
FIG. 5C depicts a first carriage configuration usable with a flatbed embodiment that permits depositing and curing during both X and −X translation of the carriage on the gantry.
Figure 5D:
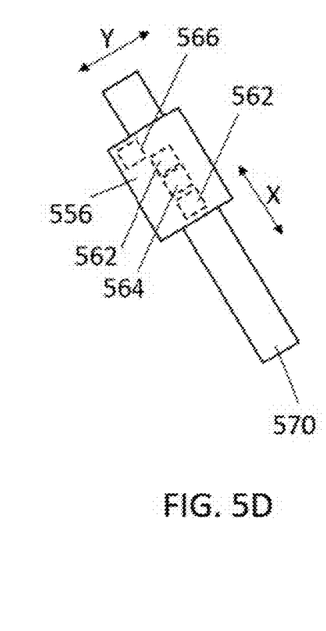
FIG. 5D depicts a second carriage configuration usable with a flatbed embodiment that permits depositing and curing during both X and −X translation of the carriage on the gantry.

In one flatbed embodiment, as shown in FIG. 5C, it may be beneficial to have multiple wide area 564 sources positioned relative to a single ink jet print head 562 (or multiple ink jet print heads 562 relative to a single wide area light source 564 as in FIG. 5D) so that the carriage may print and cure when in relative motion in both the X and −X directions across the sheet rather than printing and curing in only one direction, thereby increasing operating speed. In the arrangement depicted in FIGS. 5C and 5D, the laser source may be positioned offset from the ink jet print head by the Y dimension of the ink jet print head so that the laser exposes a previously deposited row of polymer while the next row is deposited, thereby allowing curing of the n layer by X and −X traversal also. In still other embodiments (not shown) configured to cure in both X and −X directions, multiple laser sources may be provided at opposite ends of the printing assembly aligned with the ink jet and multiple wide area laser sources of FIG. 5C or multiple ink jet print heads and single wide area laser source of FIG. 5D. It should be understood, that for a gantry or substrate configured to traverse in the direction perpendicular to that shown in FIG. 5B, the orientation of the ink jet print heads and light sources may be rearranged appropriately to permit bidirectional operation in accordance with any of the variations in FIG. 5B-5D.

In each of the arrangements, the printing assembly or at least the ink jet print head portion thereof may be moveable in the Z direction (orthogonal to both the X and Y directions) relative to the substrate and may move incrementally away from the substrate in the Z direction a distance equivalent to the layer thickness with each successive layer so that the distance from the jet to the location of the deposit remains stable. The Z distance may be a function of the viscosity of the photopolymer being deposited and the ink jet print head construction. The distance between the ink jet print head and the UV sources and the speed of revolution of the drum may also be a function of the photopolymer viscosity. The speed of the carriage traversal relative to the drum revolution is controlled so that the carriage traverses the width of the ink jet deposit area in the same time as each revolution of the drum so that the process deposits a helical spiral of photopolymer with no overlap or gaps between adjacent stripes of polymer on the drum. In the configuration depicted in FIG. 5, the printing assembly may traverse the drum in the positive X direction from left to right in a first pass while the drum rotates in a counterclockwise direction and in the negative X direction from right to left in a second pass (or the carriage may return to the left side and print only from left to right). The invention is not limited to one type of movement (left to right, right to left, or a combination thereof).

Figure 6:
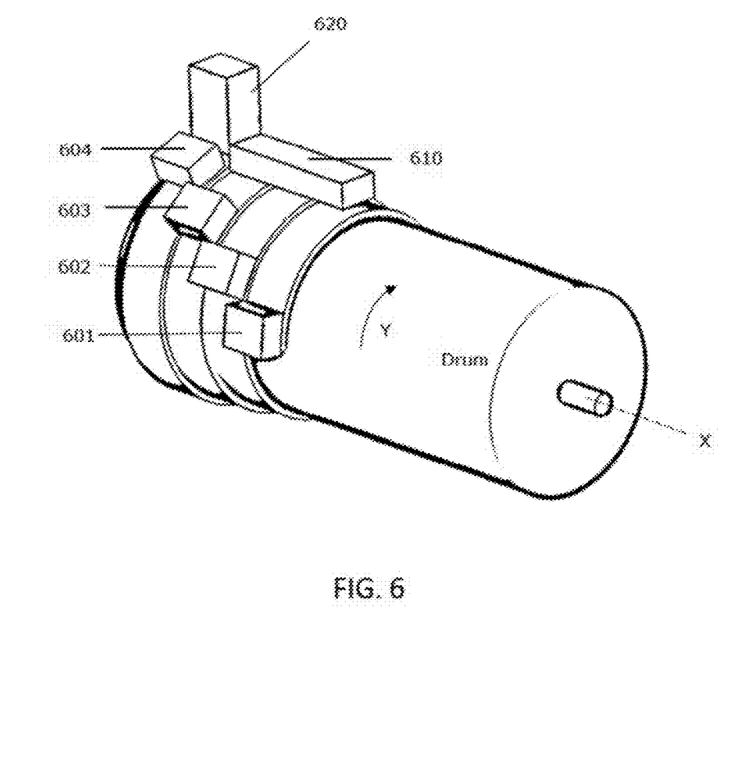
FIG. 6 depicts another exemplary system for creating a printing plate by additive manufacturing in accordance with another embodiment of the invention.

An multi-ink-jet-print-head apparatus 600, as illustrated in FIG. 6, may provide accelerated productivity as compared to the single head configuration of FIG. 5A. As shown in FIG. 6, the multi-ink-jet-print-head apparatus comprises a plurality of serially arranged ink jet print heads 601, 602, 603, and 604. Ink jet print head 601 deposits a first layer in a first stripe, ink jet print head 602 deposits a second layer on top of first layer in a second stripe, ink jet print head 603 deposits a third layer on top of the second layer in a third stripe, and ink jet print head 604 deposits a fourth layer on top of the third layer in a fourth stripe. Wide area radiation source, such as a UV LED source 610 is disposed to emit radiation over the newly deposited first, second and third stripes to cure them after their deposit. UV laser source 620 emits targeted radiation to selectively cure the fourth stripe after its deposit. Each ink jet print head typically comprises an array or matrix of arranged in a line, with individual nozzles being controllable to spray or not spray in accordance with the polymer structures desired to create a printing plate configured to print the desired image. The printing assembly traverses the drum in the X direction from left to right while the drum revolves in a counterclockwise direction as depicted in FIG. 6, with the speed of the drum and the printing assembly coordinated to deposit successive stripes in a helical spiral without gaps or overlaps between adjacent stripes on the drum.

Although shown with four ink jet print heads in FIG. 6, it should be understood that in an ideal configuration in which n layers are deposited, there may be n ink jet print heads. While n is always more than 1, and preferably more than 2, n may be any value of 2 or more. The size of the wide area source is preferably (n−1) x (width of 1 ink jet print head).

Figure 8:
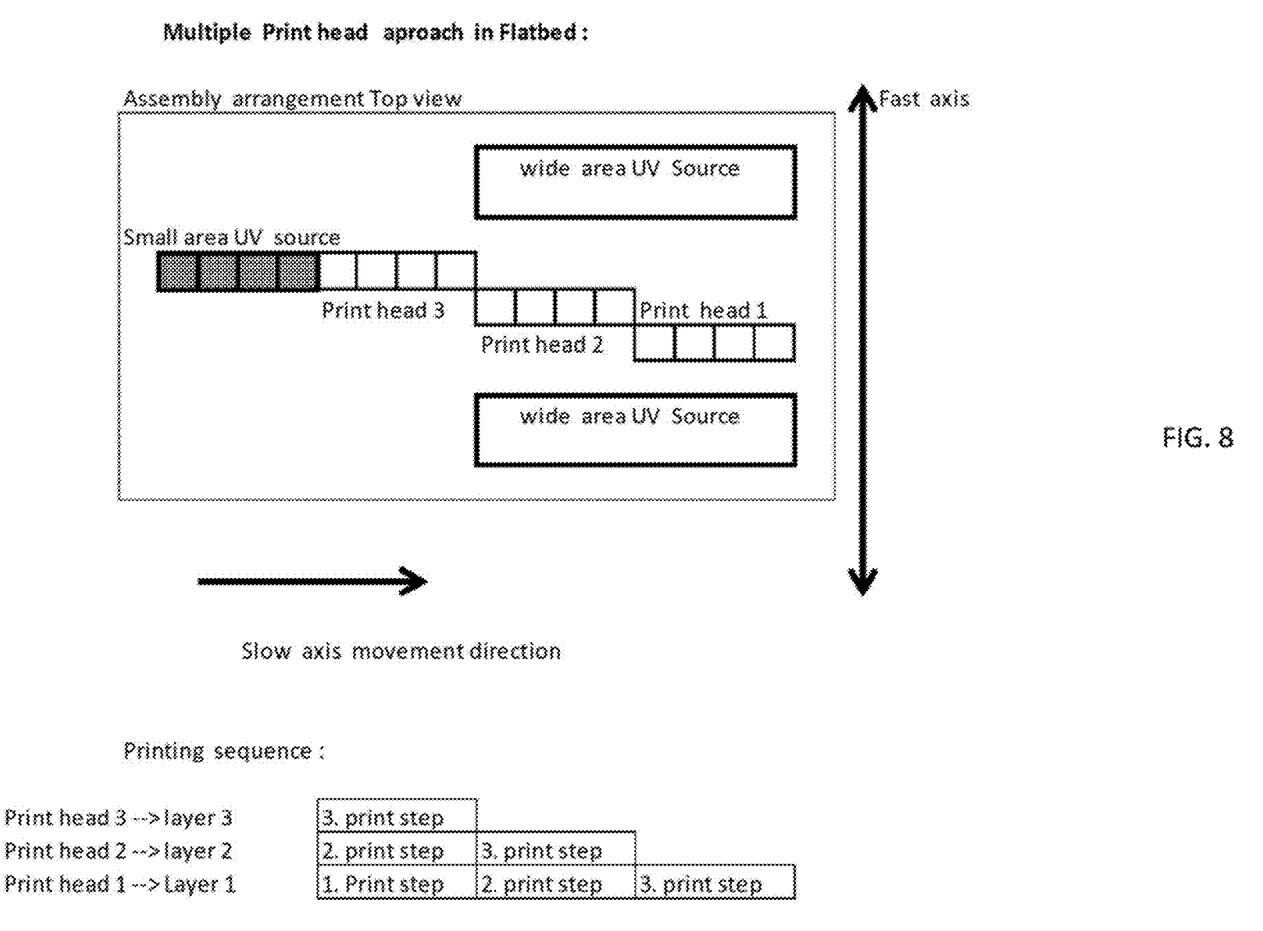
FIG. 8 depicts an exemplary multi-print-head flatbed embodiment.

A multi-jet arrangement may also be used in a flatbed arrangement. In one multi-jet arrangement, multiple jets may be disposed on a carriage configured to move in a first direction above a substrate on a stage configured to move in a second direction perpendicular to the first direction. In a second multi-jet arrangement, a plurality of jets may be positioned on a carriage configured to move in the first direction on a gantry configured to move in the second direction. Multiple light sources may be provided positioned relative to the multiple ink jets and the sequence of the ink jets may be controlled so that the carriage can print and cure in both the X and −X directions, or the print assembly may be set to print in only one direction. An exemplary arrangement is depicted in FIG. 8. In operation, the assembly incrementally moves along the "slow axis" and completes a full pass along the "fast axis" before each incremental step along the "slow axis." Thus, each printing "step" as depicted in FIG. 8 refers to a single pass long the fast axis. Thus, Step 1 deposits the leftmost strip of polymer in Layer 1 using Print Head 1. The assembly then increments along "slow axis" and in Step 2, the middle strip of Layer 1 is deposited by Print Head 1 and the leftmost strip of Layer 2 is deposited by Print Head 2. The assembly then increments along slow axis again, and in Step 3, the rightmost strip of Layer 1 is deposited by Print Head 1, the middle strip of Layer 2 is deposited by Print Head 2, and the leftmost strip of Layer 3 is deposited by Layer 3. With a wide area UV source mounted above and below Print Heads 1 and 2, each pass along fast axis is cured by the trailing UV head, and subsequent passes deposit in opposite directions. For example, if step 1 progresses in an upward direction as oriented on the page, the lowermost UV source would provide curing, and step 2 would progress in a downward direction (after the assembly moves incrementally along the slow axis the width of Print Head 1) with the uppermost UV source providing curing. Curing of Layer 3 would then be performed by small area UV source, which is depicted as a matrix or array of individually addressable pixels (each pixel of which may comprise individually addressable LEDs, pixels addressable using a DMD and a single UV light source, or points addressable using a laser). The ink jet print heads may all be arranged in the same plane or each may be arranged a different distance from the substrate, or the distance may be adjustable. In some assemblies, multiple ink jet heads, and radiation sources may be arranged such that multiple layers may be deposited in a single pass along the fast axis.

Although depicted only in FIG. 5B, it should be understood that each apparatus as depicted in FIGS. 5A-6 comprises at least one controller 580 for controlling the relative motion between the substrate and the printing assembly coordinated with the ink jet(s), the wide area radiation source(s), and the small area radiation source, in accordance with instructions for creating the printing plate, as stored in a digital memory 590. The controller and digital memory may comprise any processor or computer known in the art for processing graphic images and providing corresponding control signals to motors for moving the drum, gantry, carriage, and/or moveable stage, to ink jets, and to radiation sources. Although not shown, each ink jet comprises a connection to a source of radiation curable material to be deposited by the ink jet. Such connection may comprise a common reservoir for supplying multiple ink jets, replaceable cartridges for each ink jet, or any type of configuration known in the art.

Figure 7:
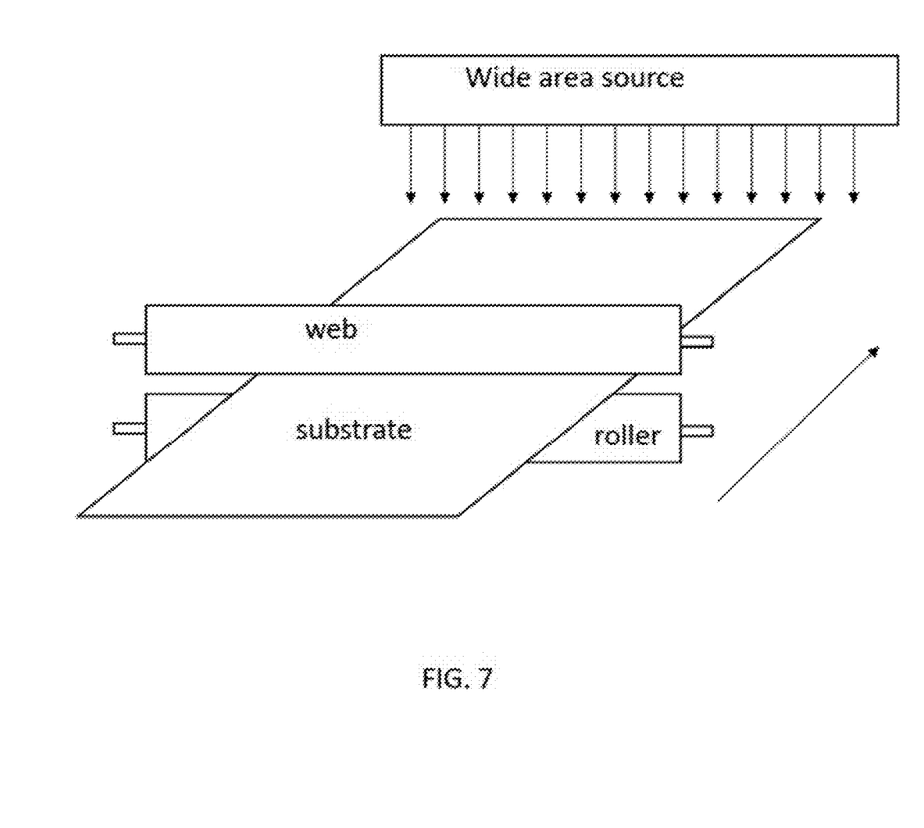
FIG. 7 depicts an exemplary system for removing uncured polymer and detacking after the final step of polymer deposit.
Figure 10:
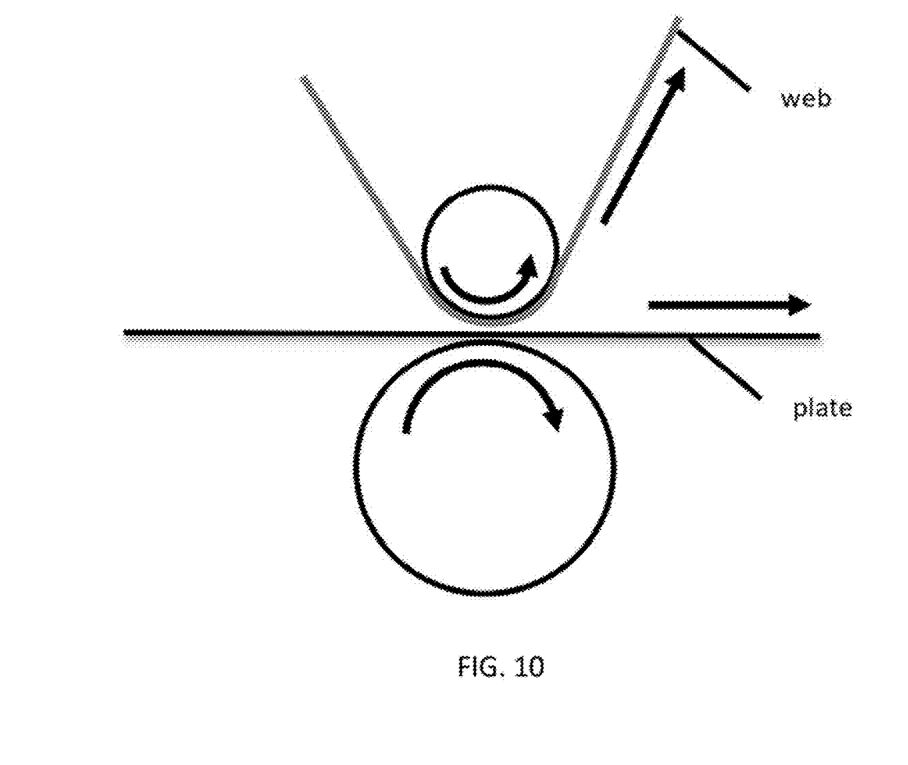
FIG. 10 depicts another exemplary system for removing uncured polymer after the final step of polymer deposit.

For any of the apparatus depicted herein for depositing and curing the layers of the printing plate, the absorptive web for removing the non-cured polymer after Step D may be provided as a roller that traverses the substrate, such as attached to a roller configured to be put into contact with the drum in the configurations depicted in FIGS. 5A and 6, or mounted on a separate gantry for traversing the substrate in flatbed embodiments. Or, in either embodiment, the substrate may be removed from the drum or flatbed and then contacted with the web in a separate process station. The wide area LED UV Light used to "detack" the plate in Step E may be the wide area source depicted in any of FIGS. 5A-6, or may be a separate bank light source provided at a separate process station, such as a process station comprising apparatus for providing sequential contact with the web and detacking exposure, such as is depicted in FIG. 7. Although depicted schematically as a web mounted to a roller above the plate, the configuration of the web may resemble that of a standard flexo plate thermal processor, such as it depicted in FIG. 10. As depicted in FIG. 10, the plate and web pass between two rollers, with the web removing uncured polymer from the plate. The used web is then wound onto a waste spool and later discarded or otherwise processed as is known in the art. Rather than a dedicated detacking step, as depicted schematically in FIG. 7, the detacking may be performed by standard polymer plate equipment, such as the dryer ovens typically known for use in solvent plate processing operations, which may have a drawer of UVA and UVC fluorescent tubes for detacking.

As used herein the "wide area radiation source" refers to a source with relatively coarse radiation coverage that is greater than the ultimate resolution desired for the printing plate detail, whereas the "small area radiation source" refer to a source with a resolution that is no greater than the resolution desired for the smallest dot to be formed on the plate. Although described herein with reference to exemplary radiation sources that emit in the UV spectrum, the invention is not limited to any particular wavelength of radiation or to polymers curable by any specific wavelength.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for constructing a printing plate, the process comprising the steps of:
    a) successively depositing a plurality of n layers of photopolymer on a substrate, the photopolymer curable by radiation in a predetermined wavelength range;
    b) curing each layer 1 through n-m after deposition of each layer, using at least one wide area radiation source having a first addressable area of coverage and configured to emit radiation in the predetermined wavelength range;
    c) selectively curing layer (n-m+1) to layer n after deposition of each layer using a small area radiation source, the small area radiation source comprising one or more second discrete addressable areas of coverage, each second discrete addressable area smaller than the first addressable area, modulated in accordance with a desired image to be printed by the printing plate;
    d) removing non-cured polymer from layers (n-m+1) to n;
    e) curing layers 1 to n with the at least one wide area radiation source, the at least one wide area radiation source including a detacking wide area radiation source.

2. The process of claim 1, wherein the step of successively depositing the plurality of layers comprises disposing a printing assembly comprising at least one ink jet print head, the at least one wide area radiation source having the first addressable area of coverage and configured to emit radiation in the predetermined wavelength range, and the small area radiation source in a spaced relationship relative to the substrate, and causing relative motion between the substrate and the printing assembly.

3. The process of claim 2, further comprising disposing the substrate on a drum rotatable on an axis and moving the printing assembly parallel to the drum while the drum rotates.

4. The process of claim 2, further comprising fixing the substrate on a flat bed and disposing the printing assembly on a carriage of a gantry, moving the carriage along the gantry relative to the substrate in a first direction and moving the gantry relative to the substrate in a second direction perpendicular to the first direction.

5. The process of claim 2, further comprising disposing the substrate on a moveable stage and disposing the printing assembly on a carriage, moving the substrate in a first direction and moving the carriage in a second direction perpendicular to the first direction.

6. The process of claim 2, wherein the printing assembly comprises a plurality of ink jet print heads, each print head comprising a plurality of nozzles and the at least one wide area radiation source comprises one or more wide area radiation sources configured to cure each layer before deposition of a subsequent layer.

7. A system for constructing a printing plate comprising a plurality of layers of a photopolymer deposited on a substrate by additive manufacturing, the system comprising:
    a printing assembly comprising:
        one or more ink jet print heads each comprising a plurality of nozzles configured to deposit a layer of the photopolymer on the substrate, the photopolymer curable by radiation in a predetermined wavelength range;
        at least one wide area radiation source configured to emit radiation in the predetermined wavelength range and having a first addressable area of coverage,
        a small area radiation source configured to emit radiation in the predetermined wavelength range with a modulation in accordance with a desired image to be printed by the printing plate and at a resolution corresponding to the desired image to be printed by the printing plate, the small area radiation source having one or more second discrete addressable areas of coverage, each second discrete addressable area of coverage smaller than the first addressable area of coverage;

means for providing relative motion between the substrate and the printing assembly;

a controller configured for controlling the relative motion between the substrate and the printing assembly in accordance with instructions stored in a digital memory;

wherein the one or more ink jet print heads comprises a plurality of n ink jet print heads, and the at least one wide area radiation source includes a single wide area radiation source configured to cure, and the controller in accordance with the instructions is configured to cause the single wide area radiation source to cure, each layer deposited by a first through (n-m)th inkjet layers before deposition of subsequent layers (n-m+1) to n, and the small area radiation source is positioned to cure, and the controller in accordance with the instructions is configured to cause the small area radiation source to cure, the (n-m+1)th to nth layers after deposition.

8. The system of claim 7, wherein the predetermined wavelength range is in an ultraviolet (UV) wavelength range.

9. The system of claim 8, wherein the at least one wide area radiation source comprises an LED UV wide area source, and the small area radiation source comprises a UV laser.

10. The system of claim 8, wherein the small area radiation source comprises a UV light source and a Digital Mirror Device for modulation of the light from the light source.

11. The system of claim 8, wherein the small area radiation source comprises an array or a matrix of individually addressable LEDs.

12. The system of claim 7, wherein the means for providing relative motion between the substrate and the printing assembly comprises a drum configured to rotate on an axis to provide relative motion in a first direction and configured to receive the substrate, and a carriage configured to move relative to the drum in a second direction.

13. The system of claim 7, wherein the system has a flatbed configuration, and the means for providing relative motion between the substrate and the printing assembly comprises a stage configured to receive the substrate and a carriage mounted on a gantry.

14. The system of claim 13, wherein the gantry is configured to move relative to the stage in a first direction and the carriage is configured to move relative to the gantry in a second direction orthogonal to the first direction.

15. The system of claim 13, wherein the stage is configured to move relative to the gantry in a first direction and the carriage is configured to move relative to the gantry in a second direction orthogonal to the first direction.

16. The system of claim 13, wherein the system is configured to provide movement of the substrate relative to the printing assembly along X and Y axes, and the printing assembly is configured to print and cure during relative movement in an X and −X direction, in a Y and −Y direction, or a combination thereof.

17. The system of claim 7, wherein a distance between the ink jet print heads and the substrate is adjustable.

18. The system of claim 17, wherein the distance is adjustable based upon a thickness of the photopolymer layer.

19. The system of claim 7, further comprising an assembly for removing uncured polymer from the printing surface of the printing plate and the at least one wide area radiation source includes a wide area radiation source for detacking the printing surface of the printing plate.

20. The system of claim 19, wherein the wide area radiation source for detacking the printing plate comprises a UV-C source.

21. The system of claim 19, wherein the assembly for removing the uncured polymer comprises a pair of rollers for receiving the plate and a web positioned between one of the rollers and the printing surface of printing plate.

22. The system of claim 7, wherein the wide area radiation source has a radiation coverage that is greater than the resolution corresponding to the desired image to be printed by the printing plate and the small area radiation source resolution is no greater than a size of a smallest dot to be printed within the desired image to be printed by the printing plate.

* * * * *